US011519620B2

(12) United States Patent
Vitullo et al.

(10) Patent No.: US 11,519,620 B2
(45) Date of Patent: Dec. 6, 2022

(54) STABILITY INDEX FOR CONNECTED EQUIPMENT

(71) Applicant: Johnson Controls Tyco IP Holdings LLP, Milwaukee, WI (US)

(72) Inventors: Steven R. Vitullo, Milwaukee, WI (US); Kelsey Carle Schuster, Wauwatosa, WI (US); Michael Richard Rhodes, Shorewood, WI (US); Jonathan Cox, St. Peters, MO (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/028,704

(22) Filed: Sep. 22, 2020

(65) Prior Publication Data

US 2022/0090805 A1     Mar. 24, 2022

(51) Int. Cl.
*F24F 11/30* (2018.01)
*F24F 11/62* (2018.01)
*G05B 15/02* (2006.01)
*F24F 110/10* (2018.01)

(52) U.S. Cl.
CPC ............. *F24F 11/30* (2018.01); *F24F 11/62* (2018.01); *G05B 15/02* (2013.01); *F24F 2110/10* (2018.01); *G05B 2219/2614* (2013.01); *G05B 2219/2642* (2013.01)

(58) Field of Classification Search
CPC ........ F24F 11/30; F24F 11/62; F24F 2110/10; G05B 15/02; G05B 2219/2614
See application file for complete search history.

(56) References Cited

U.S. PATENT DOCUMENTS

| 5,083,438 | A | 1/1992 | McMullin |
| 10,378,794 | B2 | 8/2019 | Togano et al. |
| 2006/0144057 | A1 | 7/2006 | You et al. |
| 2013/0098084 | A1 | 4/2013 | Matsuo et al. |
| 2015/0167999 | A1* | 6/2015 | Seem ................... F24F 11/30 700/276 |
| 2015/0316907 | A1* | 11/2015 | Elbsat ................ G06Q 10/06 700/275 |
| 2016/0334122 | A1* | 11/2016 | Shiel .................. F24D 19/1081 |

(Continued)

OTHER PUBLICATIONS

Johnson Controls York, "Model YK (Style H) R-134a with OptiviewTM Control Center for Electro-Mechanical Starter, Solid State Starter and Variable Speed Drive," Jun. 15, 2015, 38 pages.

*Primary Examiner* — Kenneth M Lo
*Assistant Examiner* — Yvonne Trang Follansbee
(74) *Attorney, Agent, or Firm* — Foley & Lardner LLP

(57) ABSTRACT

A method for determining a stability of a building device includes receiving time series data from building equipment regarding a first operational parameter of the building equipment, determining, for one or more time steps of the time series data, a deviation between a setpoint and a recorded value of the first operational parameter, calculating, for the one or more time steps, a trapezoidal area based on an absolute value of the deviation and a length of a time step, calculating a stability index value for the building equipment by summing the trapezoidal areas for a subset of the one or more time steps over a time horizon, and initiating an automated response based on the stability index value.

20 Claims, 10 Drawing Sheets

(56) References Cited

U.S. PATENT DOCUMENTS

| | | | |
|---|---|---|---|
| 2017/0276571 A1* | 9/2017 | Vitullo | G06Q 10/06 |
| 2017/0293293 A1* | 10/2017 | Brownie | G05B 23/0275 |
| 2017/0366414 A1 | 12/2017 | Hamilton et al. | |
| 2018/0087790 A1 | 3/2018 | Perez | |
| 2018/0373234 A1 | 12/2018 | Khalate et al. | |
| 2019/0293313 A1 | 9/2019 | Reeve et al. | |
| 2019/0293318 A1 | 9/2019 | Reeve et al. | |
| 2019/0338972 A1 | 11/2019 | Schuster et al. | |
| 2020/0019129 A1 | 1/2020 | Sircar et al. | |

* cited by examiner

STABILITY INDEX FOR CONNECTED EQUIPMENT

BACKGROUND

The present disclosure relates generally to a building management system (BMS), and more particularly, to determining a stability index for building equipment. A BMS is, in general, a system of devices configured to control, monitor, and manage equipment in or around a building or building area. A BMS can include, for example, a HVAC system, a security system, a lighting system, a fire safety system, any other system that is capable of managing building functions or devices, or any combination thereof. Operational data from equipment or devices in a BMS may be monitored to detect and/or prevent problems, and to determine whether the equipment is running as efficiently as possible.

In some cases, a large number of data points or parameters may be required to accurately determine when equipment is experiencing a problem or is running inefficiently. Additionally, some methods for identifying problems or inefficiencies are very specific to a particular type of equipment. In this regard, these methods may need to be modified in order to be applied to other, different types of equipment. Thus, it may be desirable to determine the stability of building equipment using systems and methods that do not require a large number of parameters, and that can be applied to various types of equipment.

SUMMARY

One embodiment of the present disclosure is a method for determining a stability of building equipment. The method includes receiving time series data from the building equipment regarding a first operational parameter of the building equipment, determining, for one or more time steps of the time series data, a deviation between a setpoint and a recorded value of the first operational parameter, calculating, for the one or more time steps, a trapezoidal area based on an absolute value of the deviation and a length of a time step, calculating a stability index value for the building equipment by summing trapezoidal areas for a subset of the one or more time steps over a time horizon, and initiating an automated response based on the stability index value.

In some embodiments, the automated response includes generating a user interface to present a graphical representation of the stability index value.

In some embodiments, the automated response includes flagging the building equipment for maintenance based on a determination that the stability index value is outside of a threshold.

In some embodiments, the method further includes determining a scale factor, wherein calculating the stability index value further includes multiplying the summation of the trapezoidal areas by the scale factor.

In some embodiments, the method further includes determining, for the one or more time steps, whether a value of a second operational parameter relating to energy consumption of the building equipment is below a threshold based on the time series data and filtering the time series data by setting the deviation to zero for any time steps where the value of the second operational parameter is below the threshold.

In some embodiments, the second operational parameter is a motor current.

In some embodiments, first operational parameter includes a chilled fluid temperature corresponding to an outlet of the building equipment.

In some embodiments, the building equipment is a chiller.

Another embodiment of the present disclosure is a building management system. The building management system includes one or more memory devices having instructions stored thereon that, when executed by one or more processors, cause the one or more processors to perform operations. The operations include receiving, from a building device, time series data regarding a first operational parameter of the building device, determining, for one or more time steps of the time series data, a deviation between a setpoint and a recorded value of the first operational parameter, calculating, for the one or more time steps, a trapezoidal area based on an absolute value of the deviation and a length of a time step, calculating a stability index value for the building equipment by summing trapezoidal areas for a subset of the one or more time steps over a time horizon, and initiating an automated response based on the stability index value.

In some embodiments, the automated response includes generating a user interface to present a graphical representation of the stability index value.

In some embodiments, the automated response includes flagging the building device for maintenance based on a determination that the stability index value is outside of a threshold.

In some embodiments, the operations further include determining a scale factor, wherein calculating the stability index value further includes multiplying the summation of the trapezoidal areas by the scale factor.

In some embodiments, the operations further include determining, for the one or more time steps, whether a value of a second operational parameter relating to energy consumption of the building device is below a threshold based on the time series data and filtering the time series data by setting the deviation to zero for any time steps where the value of the second operational parameter is below the threshold.

In some embodiments, the second operational parameter is a motor current.

In some embodiments, the first operational parameter includes a chilled fluid temperature corresponding to an outlet of the building equipment.

In some embodiments, the building device is a chiller.

Yet another embodiment of the present disclosure is a non-transitory computer-readable storage media having computer-executable instructions stored thereon that, when executed by one or more processors, cause the processors to perform operations. The operations include retrieving, from a database, time series data related to a first operational parameter of a building device, filtering the time series data based on a second operational parameter, determining, for a plurality of steps of the time series data, a deviation between a setpoint and a recorded value of the first operational parameter, calculating, for the plurality of steps, a trapezoidal area based on an absolute value of the deviation and a length of the plurality of steps, and calculating a stability index value for the building device by summing trapezoidal areas for a subset of the plurality of steps over a time horizon.

In some embodiments, the operations further include dynamically generating a user interface to present a graphical representation of the stability index value.

In some embodiments, the operations further include flagging the building device for maintenance based on a determination that the stability index value is below a threshold.

In some embodiments, the first operational parameter is a chilled water supply temperature and the second operational parameter is an energy consumption for the building device.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, a stability analysis system is shown, according to some embodiments. At a high level, the stability analysis system may be configured to monitor operational data from building equipment and generate a stability index value that indicates how closely the building equipment is maintaining setpoints. The stability index value may be a quantitative indicator of equipment performance, and in some cases can be utilized to diagnose problems with the building equipment and/or to determine the overall equipment health. The stability index may also indicate that the building equipment requires maintenance or service in order to correct or prevent problems, which may lead to unnecessary equipment down time, costly repairs, equipment failure, etc.

The stability analysis system can include a controller or other central processing unit that monitors and/or receives operational data from building equipment and/or a database. The operational data can be applied to an algorithm or a model that calculates the stability index. Based on the stability index, any number of automated responses may be initiated. For example, if the stability index indicates a problem with the building equipment, maintenance or service can be automatically scheduled for the affected equipment. The stability index may also be used to determine the health of the equipment or system, and can be used to generate a health dashboard (i.e., graphical user interface).

Building with Building Systems

Figure 1:
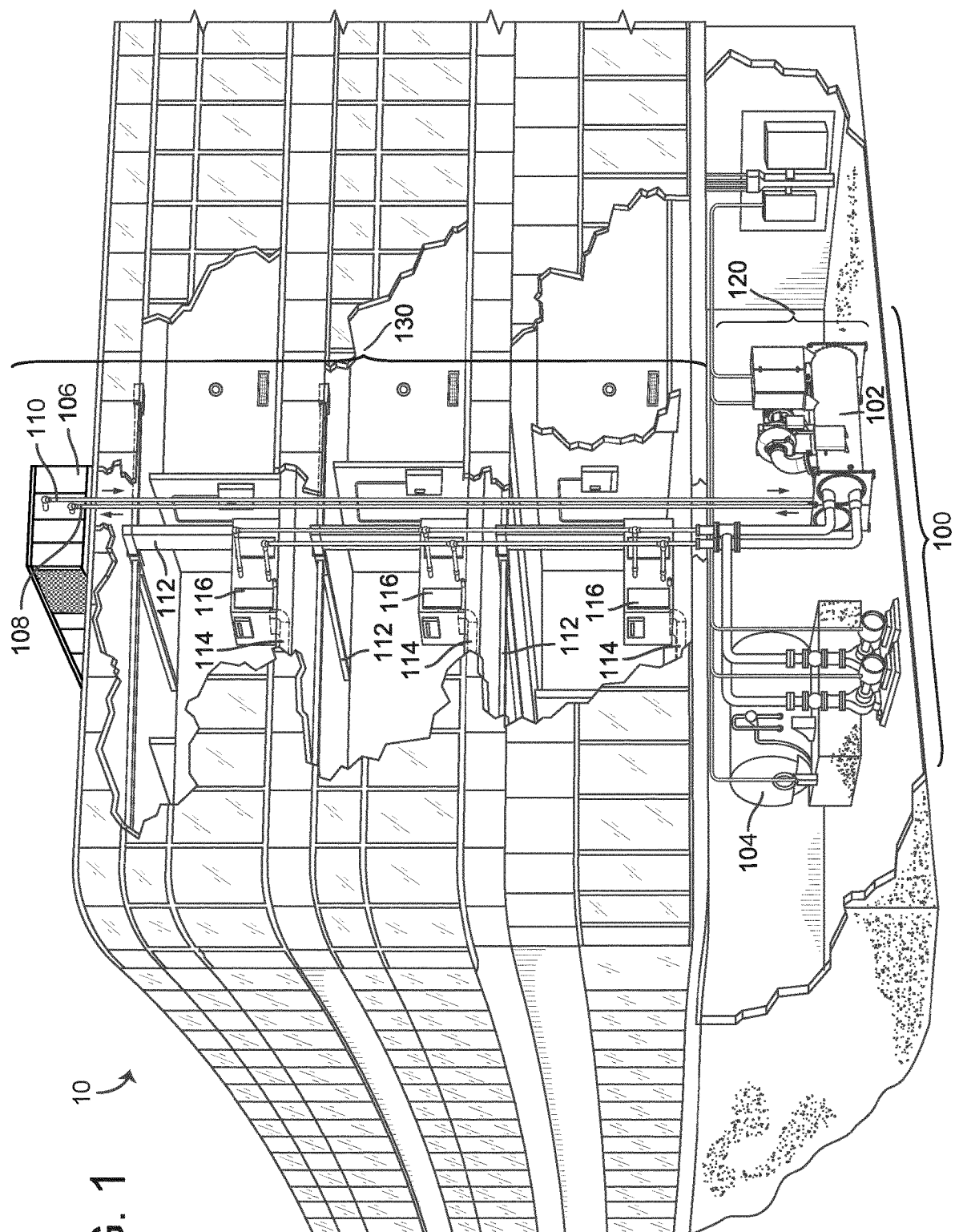
FIG. 1 is a drawing of a building equipped with a HVAC system, according to some embodiments.

Referring now to FIGS. 1-4, an exemplary building management system (BMS) and HVAC system in which the systems and methods of the present disclosure can be implemented are shown, according to some embodiments. Referring particularly to FIG. 1, a perspective view of a building 10 is shown. Building 10 is served by a BMS. As discussed above, a BMS is generally a system of devices configured to control, monitor, and manage equipment in or around a building or building area, and a BMS can include, for example, a HVAC system, a security system, a lighting system, a fire safety system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
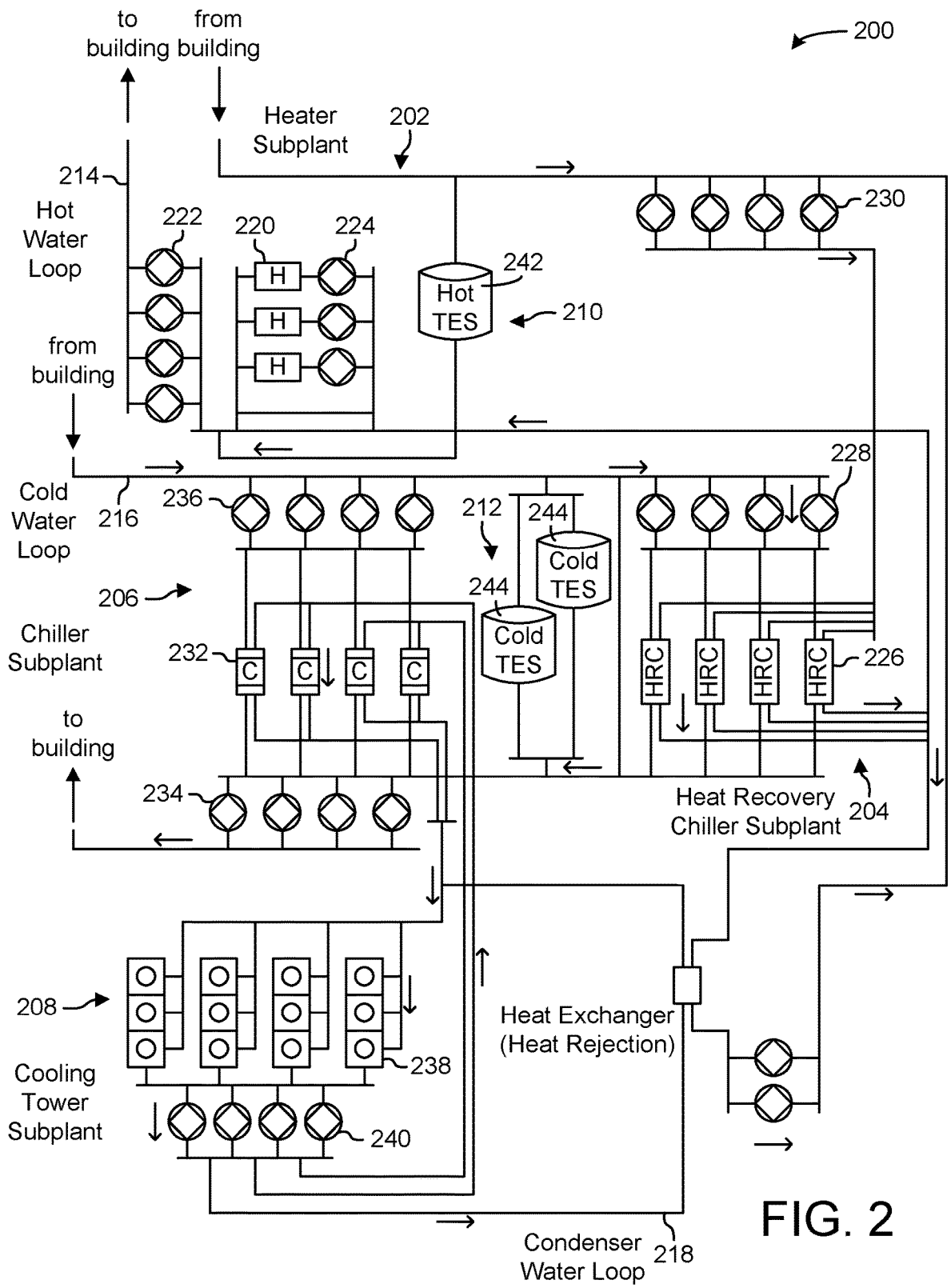
FIG. 2 is a block diagram of a waterside system that may be used in conjunction with the building of FIG. 1, according to some embodiments.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
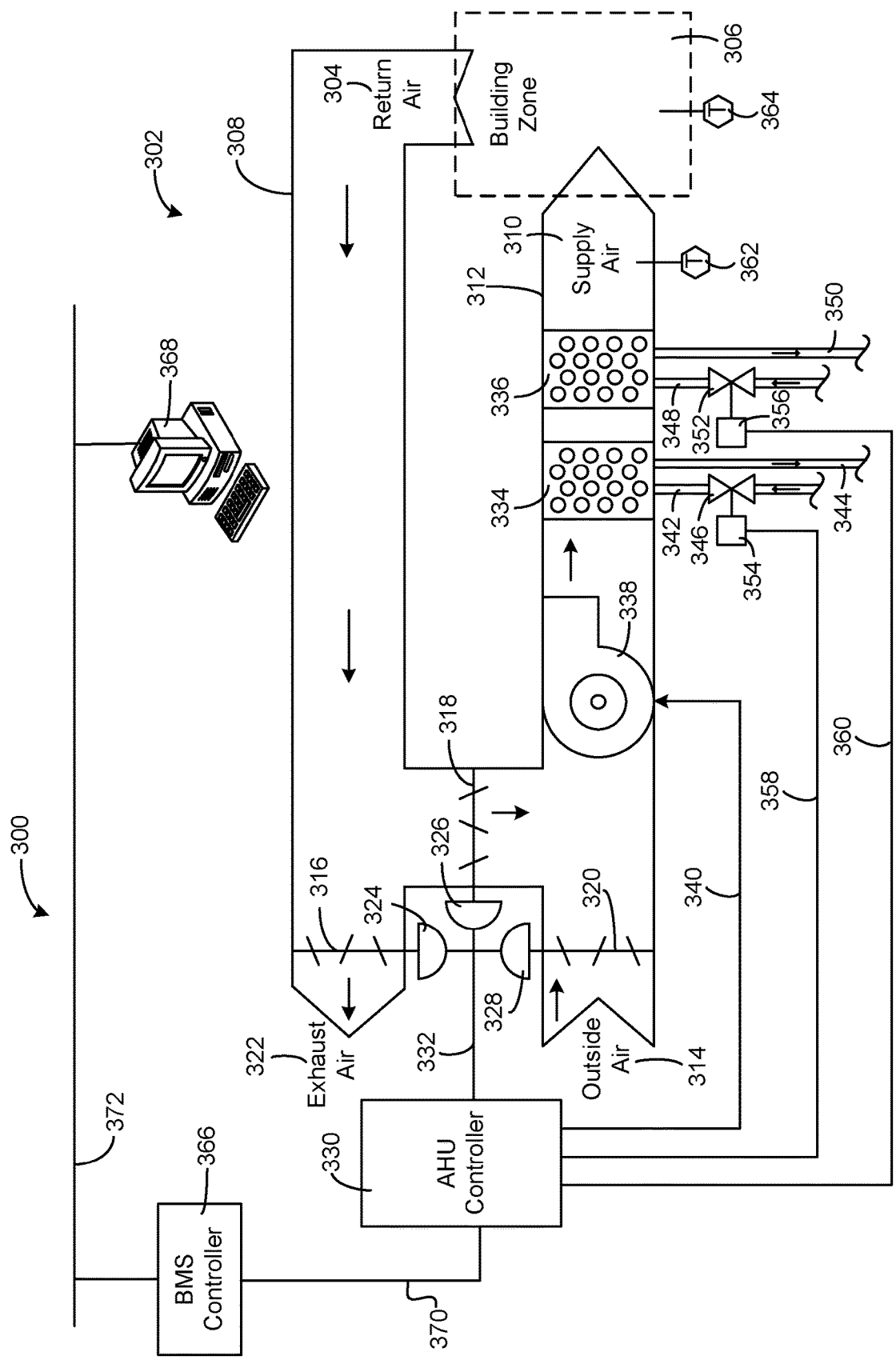
FIG. 3 is a block diagram of an airside system that may be used in conjunction with the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building automation system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
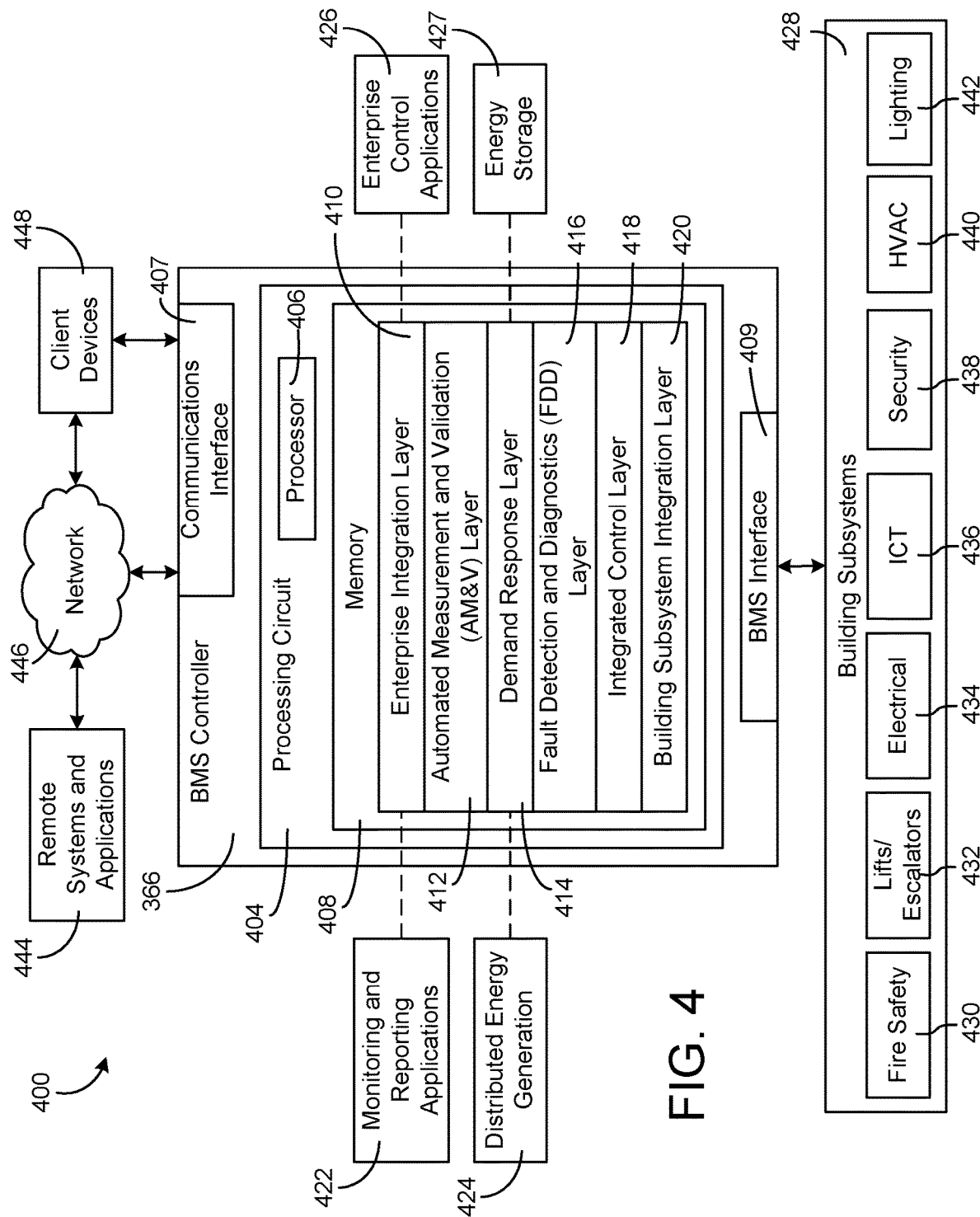
FIG. 4 is a block diagram of a building management system (BMS) that may be used to monitor and/or control the building of FIG. 1, according to some embodiments.

Referring now to FIG. 4, a block diagram of a building management system (BMS) 400 is shown, according to some embodiments. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated super-system. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Stability Analysis System

Figure 5A:
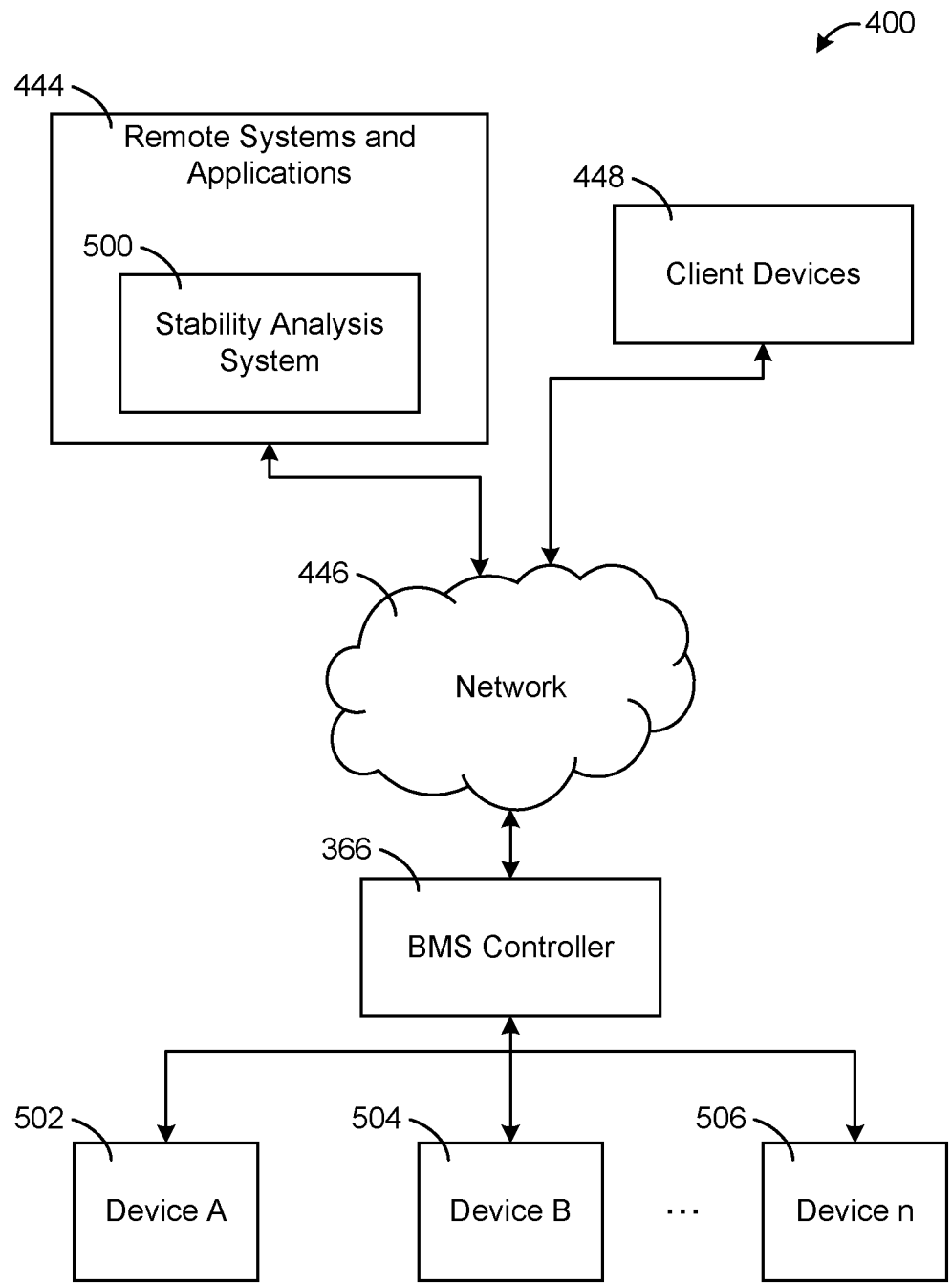
FIG. 5A is an additional block diagram of the BMS of FIG. 4 illustrating a communications network, according to some embodiments.

Referring now to FIG. 5A, a block diagram of BMS 400 is shown that illustrates network 446 in greater detail, according to some embodiments. FIG. 5A shows, in particular, a stability analysis system 500 communicably coupled to network 446. System 500 may be one of the remote systems and applications 444 discussed above with respect to FIG. 4, for example. In some embodiments, system 500 is hosted (e.g., implemented) by a dedicated server, computer, controller, or other processing device. In other embodiments, system 500 may be hosted or implemented by one of client devices 448, or may be a subsystem of BMS controller 366. In this regard, the functionality of system 500, as described herein, may be implemented by any suitable remote device and/or BMS controller 366, or by a combination of a remote device and BMS controller 366.

Accordingly, it will be appreciated by those in the art that the particular layout of the components shown in FIG. 5A is one example of the implementation of system 500, and is not intended to be limiting.

BMS controller 366 may be communicably coupled to any number of devices (e.g., building equipment), shown as devices 502-506. Devices 502-506 can include any of the equipment described above with respect to building subsystems 428, including but not limited to electrical equipment, ICT equipment, security equipment, HVAC equipment, lighting equipment, lift/escalators equipment, and fire safety equipment. System 500 may receive operational data from devices 502-506 via BMS controller 366 (e.g., collected by BMS controller 366) and/or network 446. In some embodiments, devices 502-506 may also be communicably coupled directly to network 446. In such embodiments, remote systems such as system 500 may be able to receive operational data directly from device 502-506.

Figure 5B:
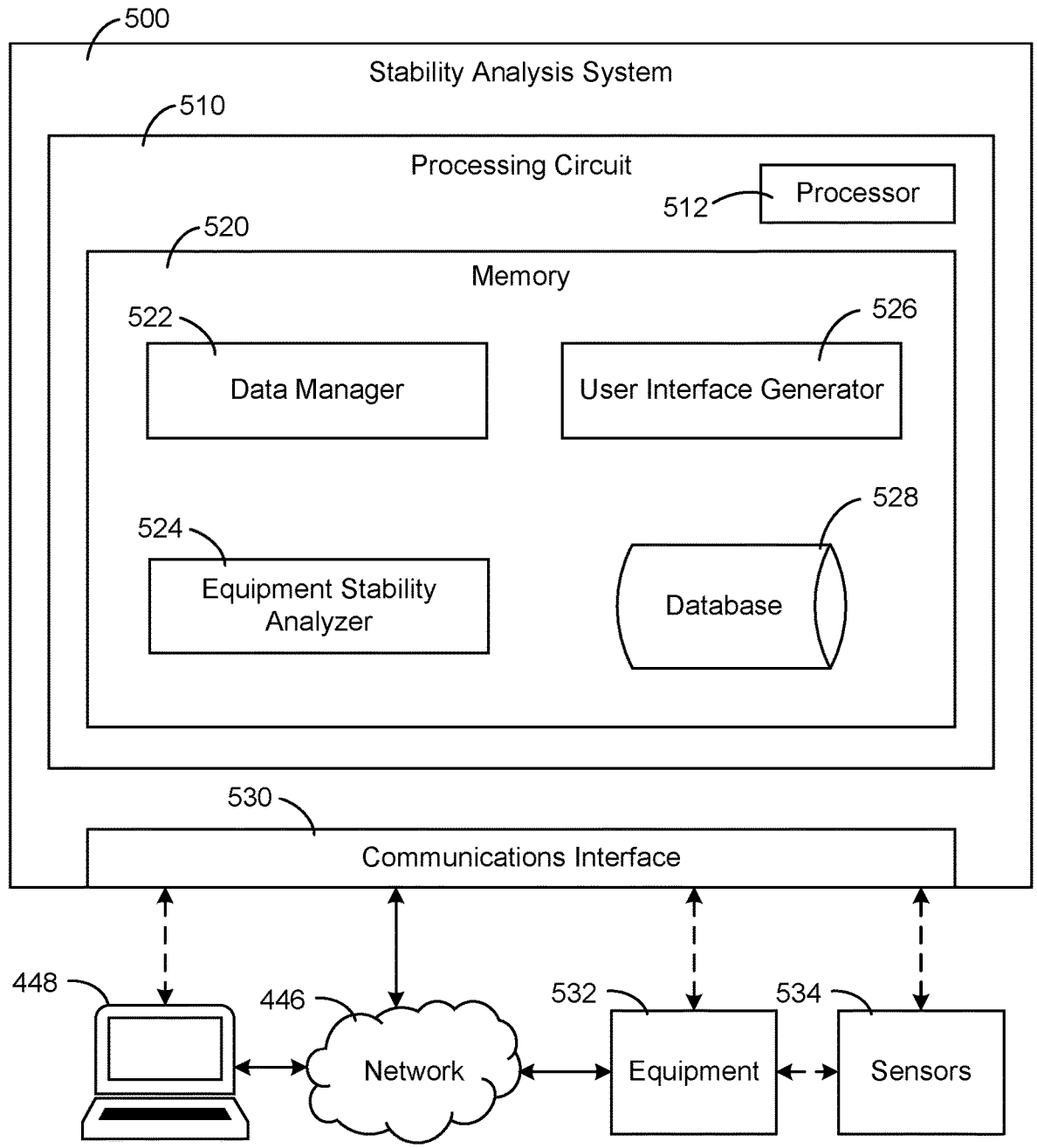
FIG. 5B is a block diagram of a stability analysis system, according to some embodiments.

Referring now to FIG. 5B, a block diagram of stability analysis system 500 is shown, according to some embodiments. In general, system 500 functions by processing operational data received from a variety of building equipment (e.g., devices 502-506) to determine a stability index for the building equipment. As briefly discussed above, the stability index is a metric that indicates the stability, and thereby the overall health and efficiency, of building equipment. In this regard, the stability index may be useful in determining whether equipment is running optimally (e.g., efficiently), or whether the equipment is experiencing issues or problems that may lead to excessive wear, inefficiency, failure, etc., if left unaddressed. The stability index may be a useful metric for monitoring system operations and, in some cases, may allow for the early diagnosis and repair of equipment issues.

System 500 is shown to include a processing circuit 510 that includes a processor 512 and a memory 520. It will be appreciated that these components can be implemented using a variety of different types and quantities of processors and memory. For example, processor 512 can be a general purpose processor, an application specific integrated circuit (ASIC), one or more field programmable gate arrays (FPGAs), a group of processing components, or other suitable electronic processing components. Processor 512 can be communicatively coupled to memory 520. While processing circuit 510 is shown as including one processor 512 and one memory 520, it should be understood that, as discussed herein, a processing circuit and/or memory may be implemented using multiple processors and/or memories in various embodiments. All such implementations are contemplated within the scope of the present disclosure.

Memory 520 can include one or more devices (e.g., memory units, memory devices, storage devices, etc.) for storing data and/or computer code for completing and/or facilitating the various processes described in the present disclosure. Memory 520 can include random access memory (RAM), read-only memory (ROM), hard drive storage, temporary storage, non-volatile memory, flash memory, optical memory, or any other suitable memory for storing software objects and/or computer instructions. Memory 520 can include database components, object code components, script components, or any other type of information structure for supporting the various activities and information structures described in the present disclosure. Memory 520 can be communicably connected to processor 512 via processing circuit 510 and can include computer code for executing (e.g., by processor 512) one or more processes described herein.

Memory 520 is shown to include a data manager 522. Data manager 522 is generally configured to perform a variety of functions using operational data received from equipment 532 and/or sensors 534 via a communications interface 530, described in detail below. Upon receiving said operational data, data manager 522 can be configured to preprocess and/or store the operational data in a database 528. Subsequently, data manager 522 can retrieve stored data from database 528 for further processing (e.g., by another component of system 500). In this manner, data manager 522 may also be configured to "direct" the flow of data between components of system 500.

Operational data, as discussed herein, can generally include any sort of data or signal regarding the operations of equipment 532. Operational data may include any equipment parameters, measurements, or metrics such as temperature, pressure, status, speed, load, etc. In one example, operational data for a chiller can include fluid outlet and/or inlet temperatures and pressures, compressor speed and energy consumption, compressor oil level and pressure, fan motor energy consumption, etc. In another example, operational data for an AHU could include discharge air temperature, fan motor current, etc. In some embodiments, operational data is received directly from equipment 532 (e.g., from internal or embedded sensors). In other embodiments, operational data is received from sensors 534 or from any combination of equipment 532 and sensors 534.

Equipment 532 may include any number of devices (i.e., equipment) associated with any of building subsystems 428, as described above, such as HVAC equipment (e.g., ducts, VAVs, AHUs, etc.), security equipment (e.g., cameras, card readers, etc.), fire safety equipment (e.g., alarms, sprinklers, etc.), etc. Likewise, sensors 534 may include any number and type of suitable sensors for measuring operational parameters associated with the equipment of BMS 400. For example, sensors 534 can include temperature sensors, pressure sensors, smoke detectors, access control readers, security cameras, etc. In various embodiments, sensors 534 may be coupled to, embedded in, or collocated with equipment 532. In other words, sensors 534 may be stand-alone (i.e., external or remote) sensors, or may be embedded within equipment 532.

In some embodiments, data manager 522 preprocesses operational data received from equipment 532 and/or sensors 534 prior to storage (e.g., in database 528) and/or prior to further manipulation by other components of system 500. In such embodiments, preprocessing can include formatting, normalizing, or otherwise modifying or altering the data such that the data is in an appropriate format for storage and/or further manipulation. In one example, data manager 522 receives data in a first format or unit of measure and converts the data to a second format or unit of measure. In some embodiments, preprocessing may include time stamping the data based on a time of receipt, before the data is stored in database 528.

In some embodiments, data manager 522 stores data that is not formatted, normalized, or otherwise modified (i.e., raw data) in database 528. In such embodiments, data manager 522 may retrieve the data at later time (e.g., prior to routing the data to another component of memory 520) for preprocessing. In such embodiments, data manager 522 may format, normalize, or otherwise modify the data upon retrieval of the data from database 528. For example, raw operational data stored in database 528 may be retrieved at a regular time interval for further analysis, in response to a user request for a particular report, to generate or update a user interface, etc. In some cases, preprocess the retrieved data may include backfilling or forward-filling datasets, as discussed in further detail below with respect to step 602 of process 600.

It will be appreciated that, as described herein, database 528 can be implemented as a single database or multiple separate databases working together. Database 528 can be configured to maintain a wide variety of data and data types associated with system 500. For example, database 528 can generally maintain raw and/or preprocessed equipment operating data, along with other historical data relating to the operations of equipment 532. It will also be appreciated that, while shown as an internal component of system 500, database 528 could also be implemented at least partially by one or more external databases (e.g., hosted by one or more remote devices).

Still referring to FIG. 5, memory 520 is also shown to include an equipment stability analyzer 524. In general, equipment stability analyzer 524 may receive operational data (e.g., raw or preprocessed) from data manager 522 and, in some cases, may retrieve stored data directly from database 528. Equipment stability analyzer 524 is generally configured to perform various analyses, using current or historical operational data, in order to determine a stability index for a building device (e.g., equipment 532). As described above, the stability index may provide an indication of the health and/or efficiency of a building device, allowing for improved and preemptive maintenance of failing or problematic equipment, thereby leading to decreased downtime and repair costs.

As described below in greater detail with respect to FIG. 6, equipment stability analyzer 524 may apply the operational data to a stability index model. In some embodiments, the stability index model includes a series of algorithms used to calculate a stability index value from the operational data. In some embodiments, equipment stability analyzer 524 utilizes machine learning algorithms or neural networks to train and improve the stability index calculation. Based on the stability index, equipment stability analyzer 524 may determine one or more automated (i.e., automatic) responses. In some cases, equipment stability analyzer 524 may cause a user interface (UI) generator 526 to generate a graphical user interface based on the stability index. In other cases, equipment stability analyzer 524 may determine and transmit (e.g., via data manager 522 and/or communications interface 530) one or more control decisions to equipment 532, causing one or more devices of equipment 532 to cease operations, adjust operating parameters, etc. In yet other cases (e.g., where the stability index is below a threshold), equipment stability analyzer 524 may automatically determine and/or schedule an appropriate maintenance or service request to correct problems with equipment stability analyzer 524.

UI generator 526 may be configured to dynamically generate graphical user interfaces for presenting a wide variety of information regarding system 500. As an example, UI generator 526 may generate a graphical user interface to present the stability index value(s) calculated by equipment stability analyzer 524. In another example, UI generator 526 can generate a graphical user interface that includes a "health dashboard," presenting an overview of the stability and/or health of a plurality of equipment or devices. UI generator 526 may be implemented as a webserver that can store, process, and deliver web pages (e.g., HTML documents) to a web browser of a user device 546, or as an application on a user device 546 (e.g., desktop application, mobile application), for example, although it will be appreciated that UI generator 526 can be implement in any other suitable manner as well. UI generator 526 may generally receive inputs (e.g., HTTP requests) from one or more of client devices 448, thereby providing an interface for a user to interact with system 500.

Still referring to FIG. 5B, system 500 is also shown to include communications interface 530 configured to exchange data with a plurality of remote systems and/or devices. In particular, communications interface 530 may allow system 500 to exchange data via network 446, as previously described. In this manner, system 500 may transmit and/or receive data from any of the components of BMS 400 via communications interface 530. In some embodiments, communications interface 530 may also facilitate the conversion and/or translation of various data or communication types or formats, to allow system 500 to interface with a wide variety of external systems and devices.

In some embodiments, system 500 may communicate directly with one or more client devices 448 via communications interface 530. In other embodiments, system 500 may communicate with client devices 448 via network 446. As described above, client devices 448 may include any electronic device that allows a user to interact with system 500 and/or BMS 400 through a user interface. Examples of user devices include, but are not limited to, mobile phones, electronic tablets, laptops, desktop computers, workstations, and other types of electronic devices. One or more of client devices 448 may present (i.e., display) a plurality of user interfaces generated by system 500 including, in some cases, an interface that presents the stability index for one or more devices.

In some embodiments, system 500 may also exchange data directly with equipment 532 and/or sensors 534 via communications interface 530. In some such embodiments, communications interface 530 may include a wired and/or wireless BACnet interface in addition to other types of communications interfaces (e.g., Modbus, LonWorks, DeviceNet, XML, etc.) to facilitate communication with equipment 532 and/or sensors 534. In other embodiments, system 500 may exchange data with equipment 532 and sensors 534 via network 446, as described above with respect to FIG. 5A. In such embodiments, data from equipment 532 and/or sensors 534 may be received and otherwise manipulated by BMS controller 366, before being transmitted to system 500 via network 446. Accordingly, it will be appreciated that equipment 532, sensors 534, and/or client devices 448 may be communicably coupled to system 500 in any suitable manner, and that the particular configuration shown in FIG. 5B is not intended to be limiting.

Figure 6:
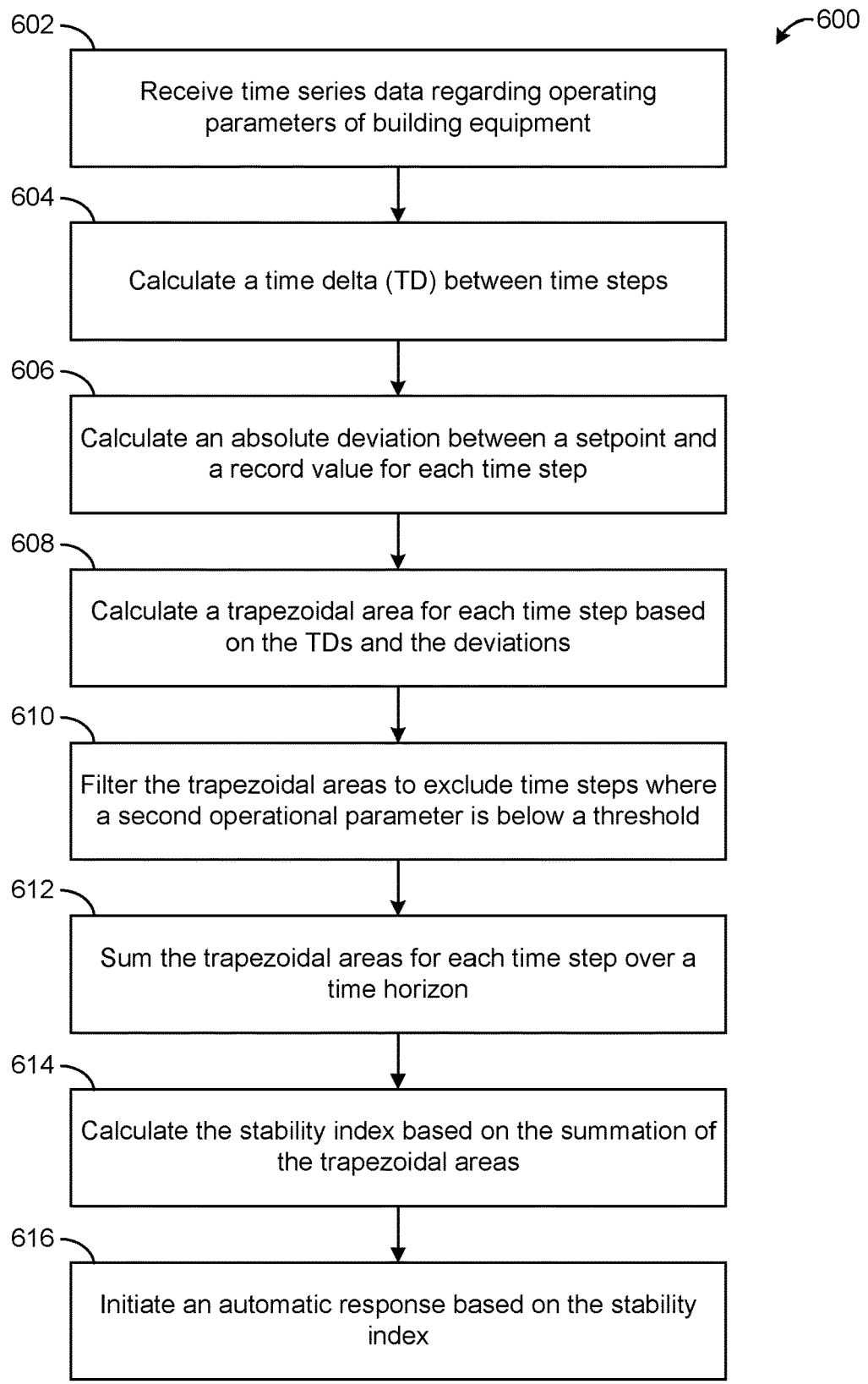
FIG. 6 is an example process for determining a stability index value for equipment, according to some embodiments.

Referring now to FIG. 6, an example process 600 for determining a stability index for building equipment (e.g., equipment 532) is shown, according to some embodiments. In some embodiments, process 600 is implemented by system 500. It will be appreciated that certain steps of process 600 may be optional and, in some embodiments, process 600 may be implemented using less than all of the steps and/or different steps than are shown in FIG. 6. As described below, process 600 may include steps for determining a stability index for a building device (e.g., a chiller, a cooling tower, a boiler, an AHU, etc.) that provides a heated or cooled fluid (e.g., water, coolant, air, etc.), but it will be appreciated that process 600 may also be used to calculate a stability index for other building equipment.

In one example, where process 600 is implemented to determine a stability index for a chiller (e.g., chiller 102), the stability index may indicate how efficiently the chiller is operating, and thereby how stable the chiller is. A chiller's primary goal is to provide chilled water for building cooling. To meet the chilled water requirements, a chiller must deliver chilled water that is at a temperature typically between 38 to 46° F. While the dynamics of chiller operations can be complex, and chillers can be affected by many different issue, most problems will affect the chillers ability to maintain chilled water setpoint and, accordingly, may cause a loss of chilled water stability. The stability index described herein may provide an indicator of these chiller instabilities. In other embodiments, the stability index may likewise indicate an efficiency of other building equipment such as a boiler, cooling tower, AHU, etc.

At step 602, time series data regarding at least one operational parameter of a building device or equipment (i.e., equipment 532) is received. Time series data, as described herein, is generally a data set that includes a series of data points indexed in time order. In some embodiments, operational data (e.g., data regarding at least one operational parameter of a device) is collected in a series of discrete, equally-spaced points in time (i.e., time steps). In other words, the operational data for building equipment, as described above with respect to FIG. 5B, is typically discrete-time data that is collected and/or recorded at a series of time periods.

In some embodiments, such time series operational data is received directly from building equipment (e.g., from internal or embedded sensors of equipment 532). In other embodiments, operational data is received from one or more external or remote sensors, or from a combination of internal and external sensors. In some such embodiments, where operational data is received from building equipment and/or sensors, the data may be time stamped with a time of receipt. In some cases, time stamped operational data is stored in a database (e.g., database 528) for later retrieval and manipulation. Accordingly, in some embodiments, the time series operational data is retrieved from a database (e.g., database 528), having previously been received and stored (e.g., by data manager 522).

In some embodiments, the first operational parameter is an outlet fluid temperature for building equipment that provides heated or cooled fluid (e.g., water, air, coolant, oil, etc.). In particular, the first operational parameter may be a chilled water supply temperature for a chiller, cooling tower, or other device, a heated water supply temperature for a boiler or other similar device, or even a discharge air temperature for an AHU or rooftop unit. Accordingly, the time series data received at step 602 may include fluid supply/discharge temperatures recorded at an outlet of the chiller, cooling tower, boiler, AHU, etc. The time series data may also include a setpoint for the outlet fluid temperature. In the example of a chiller, the time series data may include both a chilled water supply temperature and chilled water supply temperature setpoint.

Figure 7:
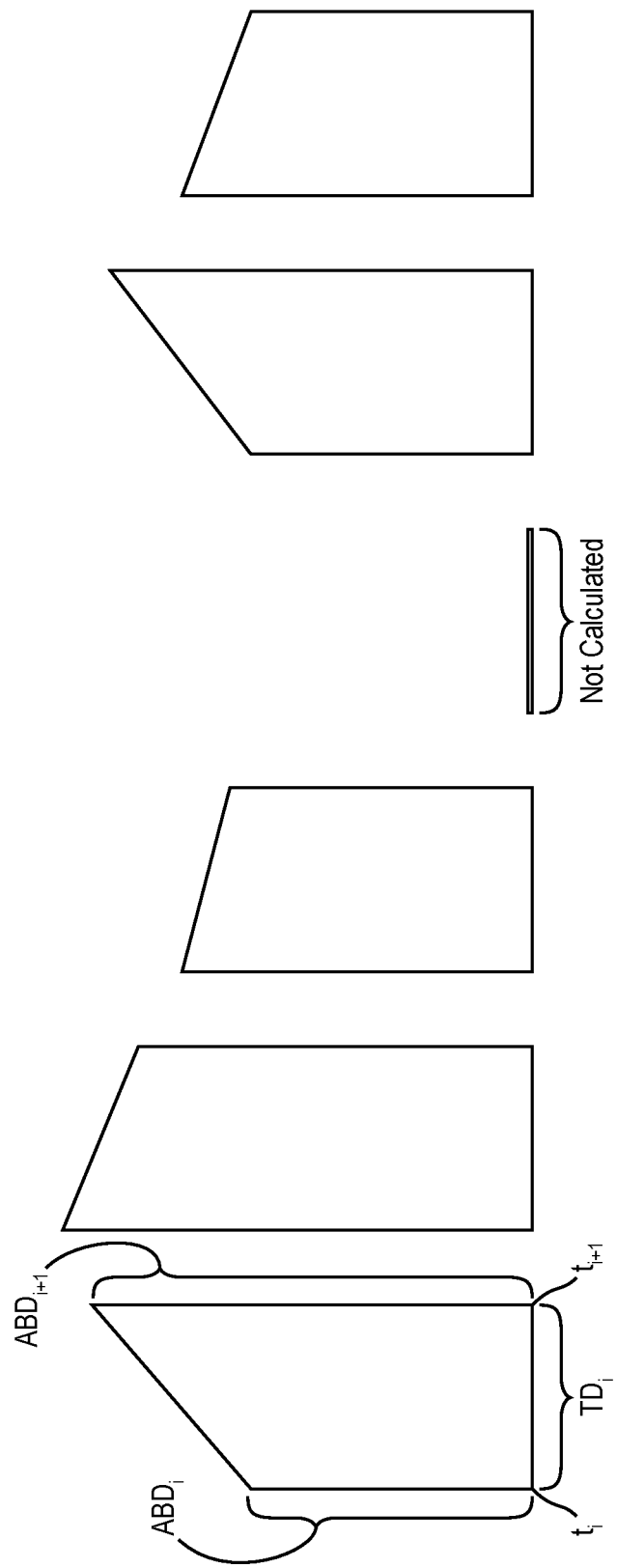
FIG. 7 is an example graph illustrating trapezoidal areas over a plurality of time periods, according to some embodiments.

At step 604, a time delta is calculated for one or more time steps of the time series data. A time delta may indicate the length of an individual time step, based on a difference between a first and a second time step. In some embodiments, the time steps of the time series data are represented as a series of $t_i$ from $t_1 \ldots t_n$, where n is the total number of samples in the data set. Generally, the time delta for an individual time step is calculated as:

$$TD_i = t_i - t_{i-1}$$

where $TD_i$ is the time delta at step i, and $t_i$ and $t_{i-1}$ are a first and second time step. In this case, $t_{i-1}$ represents the time step immediately before $t_i$, and the difference between these times steps is the time delta. The calculation of a time delta for each time step is illustrated in FIG. 7, which is described in detail below.

In some embodiments, the time delta is calculated only after the operational data has been preprocessed, although it will be appreciated that preprocessing is not always required. Preprocessing can include formatting, normalizing, or otherwise modifying or altering the data such that the data is in an appropriate format for storage and/or further manipulation. In various embodiments, operational data is received in a first format or unit of measure and converted to a second format or unit of measure. In some embodiments, preprocessing includes forward- or back-filling a data set. In some cases, for example, data may only be recorded when an operational parameter changes, or it may be desirable to limit the number of data points of a time series data set. In such example cases, certain data points may be removed or added to the time series data during preprocessing.

At step 606, an absolute deviation between a setpoint and a recorded value is calculated for the one or more time steps. The absolute deviation may indicate how closely a recorded value (i.e., measurement) for an operational parameter is tracking the desired setpoint. The absolute deviation is calculated taking the absolute value of the difference between a measured or recorded value for a first operational parameter and a setpoint for the first operational parameter. Mathematically, this is represented as:

$$ABD_i = |FST_i - FST_{sp_i}|$$

where $ABA_i$ represents the absolute deviation at step i, $FST_i$ represents the measured or recorded value (i.e., data point) for the first operational parameter (e.g., fluid supply temperature) at step i, and $FST_{sp_i}$ represents the setpoint for the first operational parameter at step i. Hence, the calculated absolute values form a series $ABA_1 \ldots ABA_n$ for a data set that includes a plurality of time steps. The calculation of an absolute deviation for each time step is illustrated in FIG. 7, which is described in detail below.

To continue the previous example regarding a chiller, the absolute value (ABA) at a time step may indicate how close the chilled water supply temperature is tracking to a setpoint. While a certain amount of fluctuation between the measured temperature and the setpoint is to be expected, large discrepancies between the measured temperature and setpoint can indicate inefficiencies with the chiller, particularly if the chiller fails to track the setpoint over a long period of time. In some cases, deviations between a fluid supply temperature and a setpoint can even indicate a chiller that is experiencing a malfunction or a failure, or that the chiller may fail in the near future.

At step 608, a trapezoidal area is calculated for one or more time steps. Generally, the trapezoidal areas area calculated based on the time deltas calculated for the one or more time steps at step 604 and the absolute deviations calculated at step 606. The trapezoidal area may indicate how closely the setpoint was tracked over the time step, where smaller trapezoidal areas indicate that the measured or recorded operational data was more closely tracking the setpoint. A trapezoidal area is calculated as:

$$Area_i = (ABD_i + ABD_{i+1}) \times \left(\frac{TD_i}{2}\right)$$

where $Area_i$ is the trapezoidal area for a time step i, $ABD_i$ is the absolute deviation at time step i and $ABD_{i+1}$ is the absolute deviation calculated at the time step immediately following time step i. The calculation of a trapezoidal areas is illustrated in FIG. 7, which is described in detail below.

At step 610, the calculated trapezoidal areas are filtered to exclude time steps where a second operational parameter is below a threshold. In some embodiments, the areas are filtered by setting the absolute deviation (ABA) to zero for time steps where the second operational parameter is below a threshold. In other embodiments, trapezoidal areas corresponding to a time step where the second operational parameter is below a threshold are simply not included in the summation at step 612, described below.

In some embodiments (e.g., for a chiller), the second operational parameter is a current for a motor (e.g., the compressor motor) of the chiller, typically presented as a percentage of full load amperage. In one example, if the full load amperage is below a threshold at a particular time step, such as 5% of maximum full load amperage, then it may be assumed that the compressor, and thereby the chiller, was not turned on (i.e., operating). Accordingly, any data recorded during this time step may be ignored.

At step 612, the trapezoidal areas are summed for a subset of the one or more time steps over a time horizon. The time horizon may be any suitable amount of time (e.g., a day, a month, an hour, etc.). The summation of the trapezoidal areas may be represented as a unit area (UAREA). The UAREA is calculated as:

$$Uarea_j = \Sigma_{i \in U_j} Area_j$$

where $U_j$ is unit time j. It will be appreciated that j can be any suitable amount of time, such as minutes, hours, days, etc., and may include a plurality of smaller time steps. In one example, j is an hour and includes a plurality of time steps each corresponding to a one minute interval.

At step 614, a stability index is calculated for the building equipment based on the summation of trapezoidal areas (e.g., UAREA) calculated at step 612. The stability index for unit time j is calculated as:

$$SI_j = 100 - (\lambda \times Uarea_j)$$

where $\lambda$ is an optional scale factor. In some embodiments, the scale factor is adjustable and can be tuned (e.g., based on the type of building equipment). The scale factor acts as a penalty for the UAREA value calculated at step 612. In this regard, a larger scale factor will more heavily penalize the UAREA. For example, calculating the stability index for a chiller using a scale factor of 10 will cause a penalty of 10 to the stability index for an average deviation of 1° F. from a setpoint. In some embodiments, a scale factor of 30 is used for a chiller.

At step 616, an automatic response is initiated based on the stability index. In some embodiments, the automatic response includes the generation of a graphical user interface. The graphical user interface may be presented via one or more client devices 448, and may include a graphical or textual representation of the stability index, as show in FIG. 8 below. Additionally, the graphical user interface may include other visual elements that present information relating to the first or second operational parameters, as described above. In some embodiments, the graphical user interface may include a "health dashboard" that provides an overview of the health or stability of multiple building devices in a single interface.

In some embodiments, such as when the stability index is below a threshold, the automatic response process may include generating a work order or a ticket, and/or automatically scheduling maintenance or service for a building device. In such embodiments, the threshold may be previously defined by a user (e.g., a system administrator). In some embodiments, building equipment with a stability index below a threshold may be flagged, such that a user may quickly identify the equipment and may determine additional action (e.g., scheduling maintenance). In some embodiments, the automatic response also includes generating a message or alert, and transmitting the message or alert to a remote device (e.g., client devices 448). For example, system 500 may automatically generate a text message or email, and may transmit the text message or email to a user device associated with a maintenance technician, system administrator, etc.

Referring now to FIG. 7, an example graph of a plurality of trapezoidal areas over a plurality of time periods is shown, according to some embodiments. As mentioned above, FIG. 7 may provide a visual representation of various steps of process 600. As shown, for example, the graph includes six time periods, with five of the six periods having a trapezoidal area. A first time period on the far left of FIG. 7 illustrates various variables described above with respect to FIG. 6. For example, the trapezoidal area for this first time period is shown to be calculated from an absolute deviation $ABD_i$ at a first time step $t_i$ and absolute deviation ABA-pi at a second time step $t_{i+1}$. Here, the time delta $TD_i$ is shown as the different between time $t_i$ and $t_{i+1}$. Also shown in FIG. 7 is a particular time period where a trapezoidal area is not calculated. As discussed above, this particular time period may have been filtered between a second operational parameter fell outside of a threshold.

Figure 8:
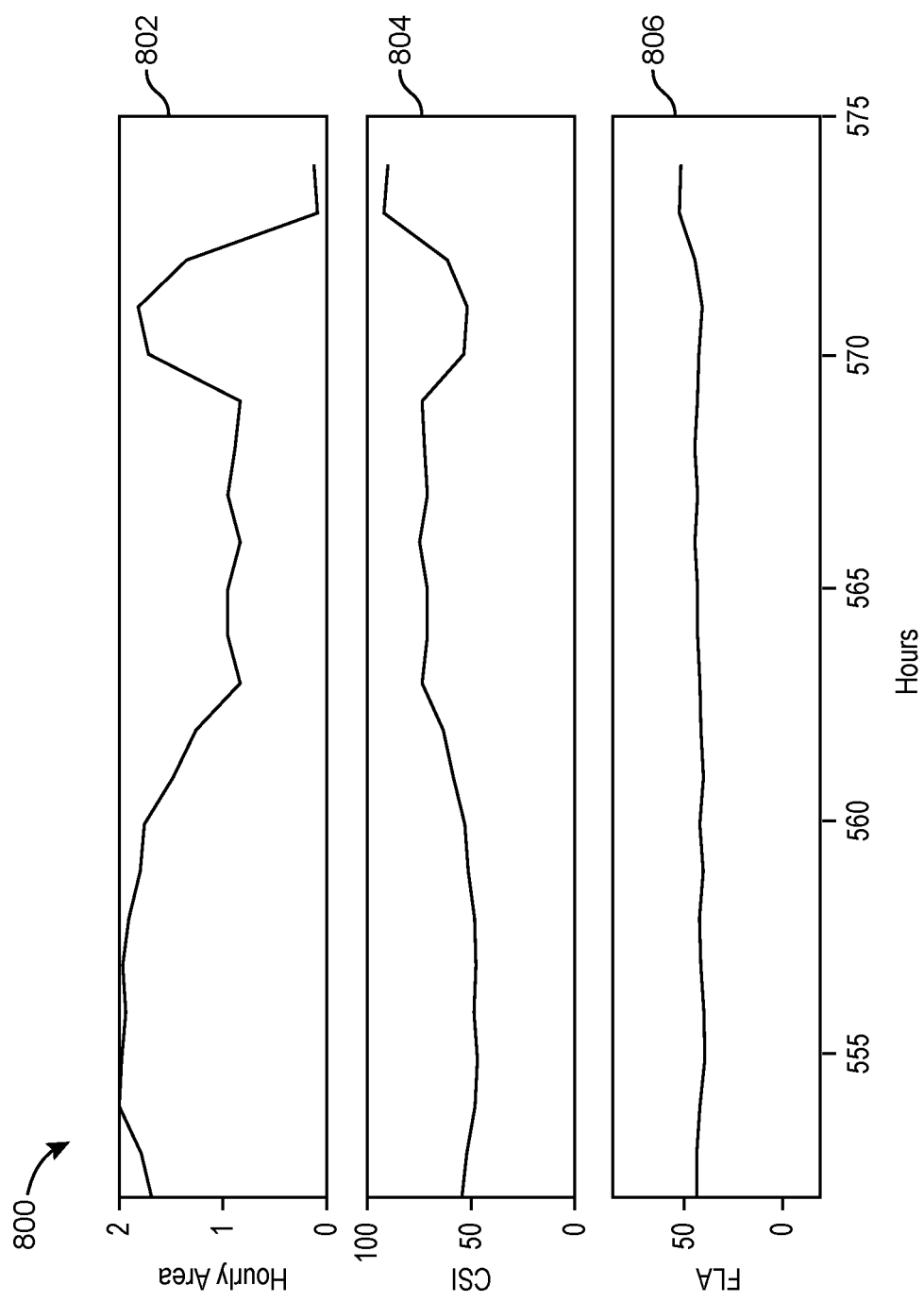
FIG. 8 is an example interface for presenting a stability index and various other parameters associated with equipment operations, according to some embodiments.

Referring now to FIG. 8, an example interface 800 for presenting a stability index and various other operational data associated with building equipment is shown, according to some embodiments. In some embodiments, interface 800 is an interface generated by UI generator 526 and presented via one or more client devices 448, as described above. In general, interface 800 presents the stability index and any additional operational data via a trend line, or other suitable graphic, over time. Accordingly, interface 800 provides, in a single interface, an overview and/or history of device performance and stability.

It will be appreciated that the elements of interface 800 may include any suitable graphical or textual elements for presenting operating data over time. However, in the example shown, interface 800 includes a plurality of graphs 802-806, which include trend lines corresponding to various operating parameters of a device. Graph 802, for example, includes a trend line corresponding to a calculated hourly area for a device. In other words, graph 802 indicates the area from the summation of a plurality of trapezoidal areas, as previous described, over a one-hour period. Graphs 804 and 806 include trend lines for a stability index value and full load amps for the device, also previous described. In this case, the x-axis of each of graphs 802-806 is a number of hours (i.e., time). The number of hours may indicate, for example, a total number of operating hours, or a number of hours since a first data point was recorded.

In a non-limiting example, interface 800 may present trend data for a chiller (e.g., chiller 102), as described above. In this example, graph 802 would include a trend line corresponding to the summation of trapezoidal areas calculated at each of a plurality of time intervals based on a deviation between a setpoint and a recorded value for an outlet water temperature of the chiller. Graph 804 may present a trend line corresponding to a stability index for the chiller, also calculated at each of a plurality of time intervals. As shown, the stability index value trend line is generally inversely proportional to the area trend line of graph 802. Graph 806 may include a trend line corresponding to the measured full load amperage (FLA) of a pump or compressor associated with the chiller. In this case, the FLA appears to stay just below 50% of a maximum value.

Figure 9:
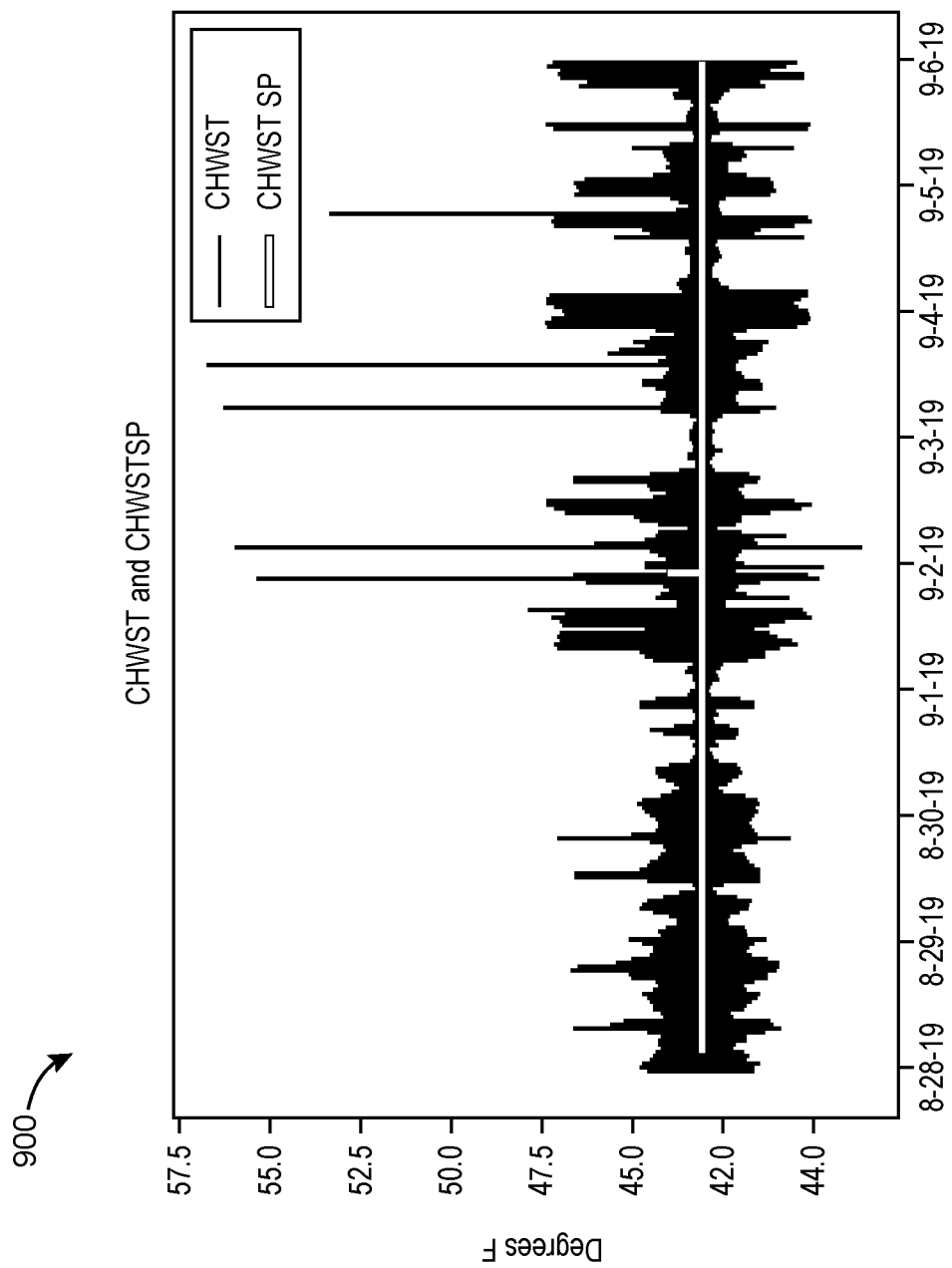
FIG. 9 is an example interface presenting chilled water temperatures over time, according to some embodiments.

Referring now to FIG. 9, an example interface 900 for presenting chilled water temperatures over time is shown, according to some embodiments. Interface 900 may be an interface generated by UI generator 526 and presented via one or more client devices 448, for example. Like interface 800 described above, interface 900 also presents operational data for a device or equipment over time. In this case, interface 900 provides a graphical representation of recorded values and setpoints for a first operational parameter of a device, thereby indicating how closely the device is following the setpoints.

In the example shown, interface 900 provides a graphical representation of chilled water temperature measurements ("CHWST") and chilled water temperature setpoints ("CHWST SP") over a time period of eight days, from August $28^{th}$ to September $6^{th}$. Chilled water temperature measurements, in this case, are represented by a solid black line while chilled water temperature setpoints are represented by a white line. Here, the chilled water temperature setpoint was set at roughly 43° F., with a slight deviation on September $2^{nd}$. The recorded chiller water temperatures are shown to fluctuate around the setpoint value, typically by about ±3° F. At certain time periods on September $2^{nd}$, $3^{rd}$, and $4^{th}$, the recorded chilled water temperature is shown to fluctuate as much as +14° F.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for determining a stability of building equipment, the method comprising:
   receiving time series data from the building equipment regarding a first operational parameter of the building equipment;
   determining, for one or more time steps of the time series data, an error between a setpoint and a recorded value of the first operational parameter;
   calculating, for the one or more time steps, a trapezoidal area using an absolute value of the error as a first side length and a length of a time step as a second side length;
   calculating a stability index value for the building equipment by summing trapezoidal areas for a subset of the one or more time steps over a time horizon; and
   initiating an automated response based on the stability index value, the automated response comprising at least one of adjusting an operation of the building equipment or adjusting an operating parameter of the building equipment.

2. The method of claim 1, wherein the automated response further comprises generating a user interface to present a graphical representation of the stability index value.

3. The method of claim 1, wherein the automated response further comprises flagging the building equipment for maintenance based on a determination that the stability index value is outside of a threshold.

4. The method of claim 1, further comprising determining a scale factor based on a type of the building equipment, wherein calculating the stability index value further comprises multiplying the summation of the trapezoidal areas by the scale factor.

5. The method of claim 1, further comprising:
   determining, for the one or more time steps, whether a value of a second operational parameter relating to energy consumption of the building equipment is below a threshold based on the time series data; and
   filtering the time series data by setting the error to zero for any time steps where the value of the second operational parameter is below the threshold.

6. The method of claim 5, wherein the second operational parameter is a motor current.

7. The method of claim 1, wherein the first operational parameter comprises a chilled fluid temperature corresponding to an outlet of the building equipment.

8. The method of claim 7, wherein the building equipment is a chiller, a boiler, or an air handling unit.

9. A building management system comprising:
   one or more memory devices having instructions stored thereon that, when executed by one or more processors, cause the one or more processors to perform operations comprising:
      receiving, from a building device, time series data regarding a first operational parameter of the building device;
      determining, for one or more time steps of the time series data, an error between a setpoint and a recorded value of the first operational parameter;
      calculating, for the one or more time steps, a trapezoidal area using an absolute value of the error as a first side length and a length of a time step as a second side length;
      calculating a stability index value for the building device by summing trapezoidal areas for a subset of the one or more time steps over a time horizon; and
      initiating an automated response based on the stability index value, the automated response comprising at least one of adjusting an operation of the building device or adjusting an operating parameter of the building device.

10. The system of claim 9, wherein the automated response further comprises generating a user interface to present a graphical representation of the stability index value.

11. The system of claim 9, wherein the automated response further comprises flagging the building device for maintenance based on a determination that the stability index value is outside of a threshold.

12. The system of claim 9, the operations further comprising determining a scale factor, wherein calculating the stability index value further comprises multiplying the summation of the trapezoidal areas by the scale factor.

13. The system of claim 9, the operations further comprising:
   determining, for the one or more time steps, whether a value of a second operational parameter relating to energy consumption of the building device is below a threshold based on the time series data; and
   filtering the time series data by setting the error to zero for any time steps where the value of the second operational parameter is below the threshold.

14. The system of claim 13, wherein the second operational parameter is a motor current.

15. The system of claim 9, wherein the first operational parameter comprises a chilled fluid temperature corresponding to an outlet of the building device.

16. The system of claim 15, wherein the building device is a chiller, a boiler, or an air handling unit.

17. A non-transitory computer-readable storage media having computer-executable instructions stored thereon that, when executed by one or more processors, cause the one or more processors to perform operations comprising:
   retrieving, from a database, time series data related to a first operational parameter of a building device;
   filtering the time series data based on a second operational parameter;

determining, for a plurality of steps of the time series data, an error between a setpoint and a recorded value of the first operational parameter;

calculating, for the plurality of steps, a trapezoidal area using an absolute value of the error as a first side length and a length of the plurality of steps as a second side length;

calculating a stability index value for the building device by summing trapezoidal areas for a subset of the plurality of steps over a time horizon; and initiating an automated response based on the stability index value, the automated response comprising at least one of adjusting an operation of the building device or adjusting an operating parameter of the building device.

18. The media of claim 17, the operations further comprising dynamically generating a user interface to present a graphical representation of the stability index value.

19. The media of claim 17, the operations further comprising flagging the building device for maintenance based on a determination that the stability index value is below a threshold.

20. The media of claim 17, wherein the first operational parameter is a chilled water supply temperature and the second operational parameter is an energy consumption for the building device.

\* \* \* \* \*